P. L. DONOVAN.
DRAFT BAR FOR HARROWS.
APPLICATION FILED MAY 7, 1917.
1,299,561.
Patented Apr. 8, 1919.
2 SHEETS—SHEET 1.
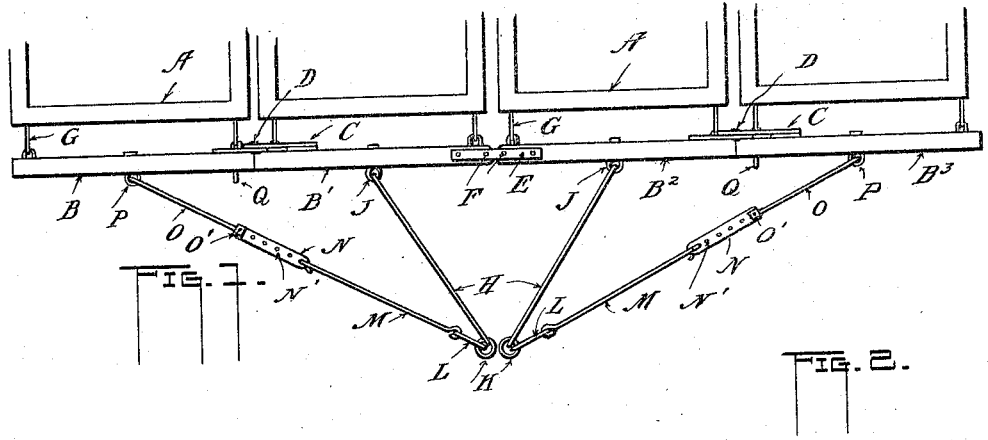
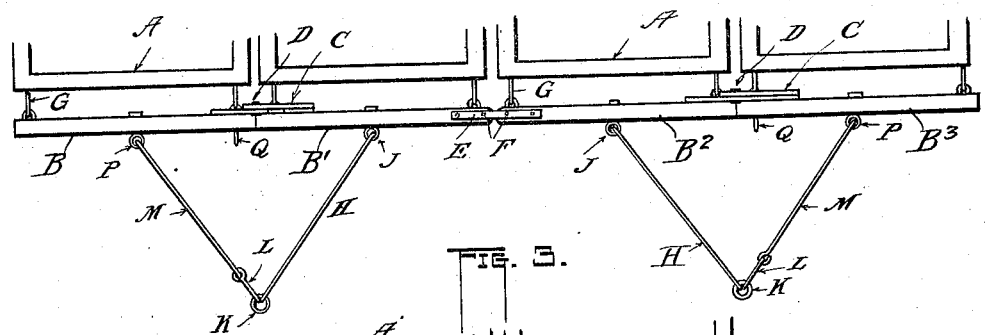
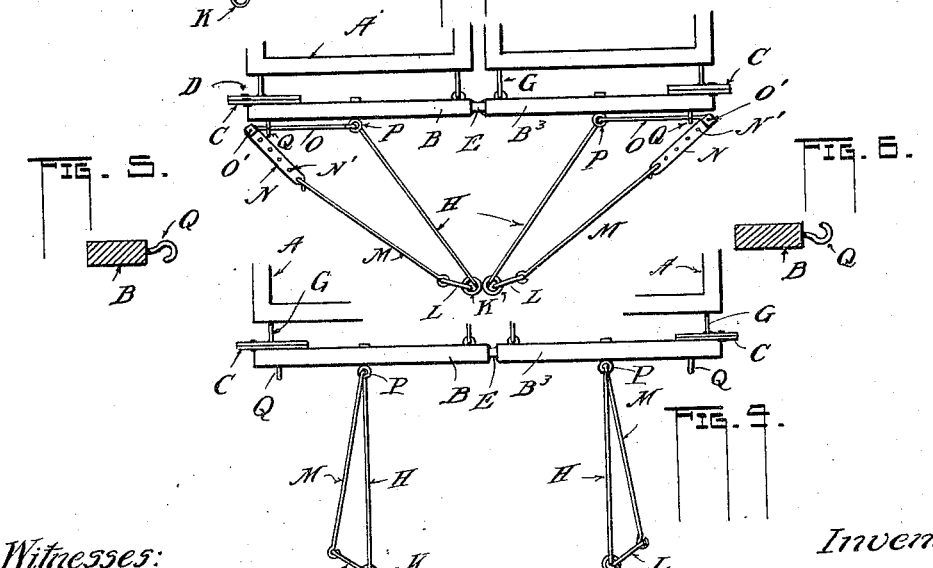
Witnesses:
Inventor:
Patrick L. Donovan, P. L. DONOVAN.
DRAFT BAR FOR HARROWS.
APPLICATION FILED MAY 7, 1917.
1,299,561.
Patented Apr. 8, 1919.
2 SHEETS—SHEET 2.
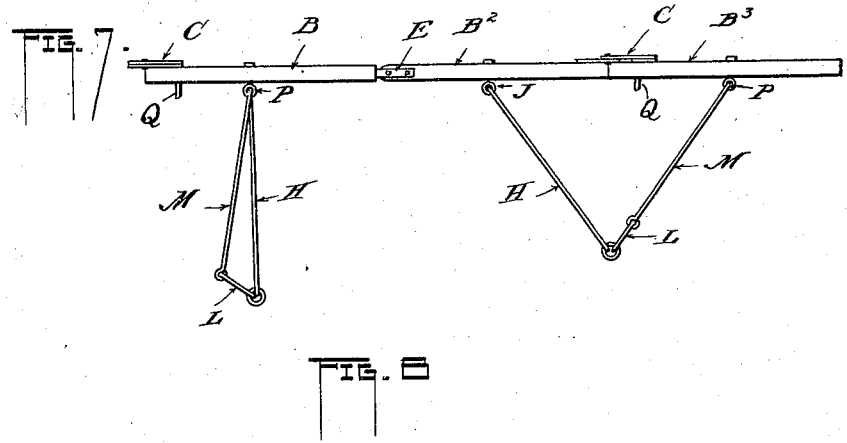
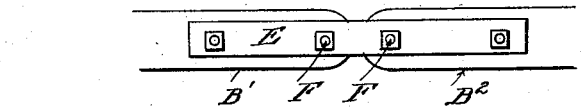
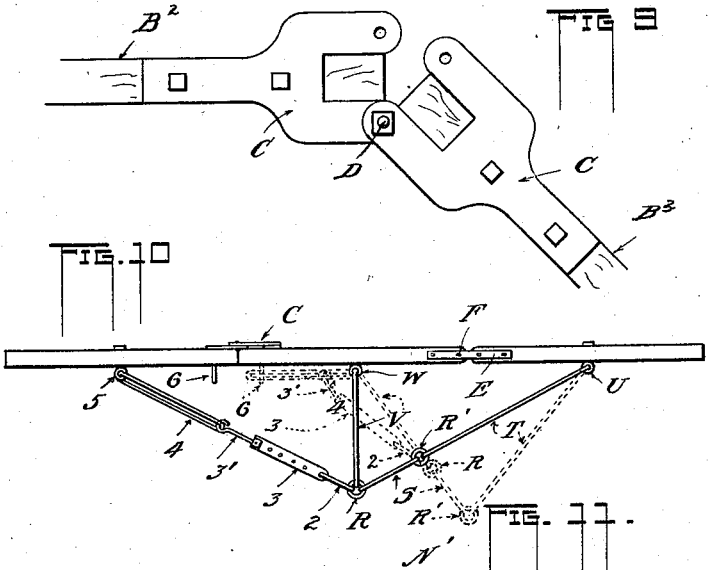
Witnesses:
Marie Dacey
Louise H Rasch
Inventor:
Patrick L. Donovan,
L. M. Thurlow
Atty.
THE NORRIS PETERS CO., PHOTO-LITHO., WASHINGTON, D. C.

UNITED STATES PATENT OFFICE.

PATRICK L. DONOVAN, OF TOULON, ILLINOIS.

DRAFT-BAR FOR HARROWS.

1,299,561.   Specification of Letters Patent.   Patented Apr. 8, 1919.

Application filed May 7, 1917. Serial No. 166,885.

*To all whom it may concern:*

Be it known that I, PATRICK L. DONOVAN, citizen of the United States, residing at Toulon, in the county of Stark and State of Illinois, have invented certain new and useful Improvements in Draft-Bars for Harrows; and he does hereby declare that the following is a full, clear, and exact description of the invention, which will enable others skilled in the art to which it appertains to make and use the same.

This invention relates to improvements in draft-bars and draft attachments for the same of the type particularly adapted for use with harrow sections or similar implements.

An object of the invention is to provide a draft attachment for a sectional foldable draft-bar for sectional harrows adapted to fold with said draft-bar, together with a support on the latter to receive an outlying extended reach of said attachment when the same is folded with said draft-bar.

Another object is the provision in a foldable draft-bar and connections for the draft animals, tractor, or other form of power, part of which will be shortened when the sections of the bar are folded so that the pull will be upon the lower sections or those nearest the ground rather than upon both the said lower sections and folded-over sections.

Another object is a peculiar arrangement and adaptation of the connections for a draft-bar that will accommodate two, three or four harrow sections and any desired manner of hitch. In providing a draft attachment for an exceedingly long foldable draft-bar there must necessarily be long reaches of the parts in order to attach to the outlying bar section, this being especially true when the draft team is hitched at a point at the middle of the length of said draft bar. In order to dispose of these long reaches without disassembling them and in order that they will not drag upon the ground, if not thus taken apart, nor be in the way, I provide a support to receive and carry parts of them when folded with the draft-bar.

Besides these objects and advantages certain details of construction are of importance as will appear in the following specification, aided by the appended drawings, wherein, Figure 1 is a plan of a draft-bar for a hitch of four harrow sections, showing one position of the draft-connections therefor.

Fig. 2 is a similar view, showing a changed relation of said connections.

Fig. 3 is a plan of the draft-bar folded to accommodate one or two harrow sections, the form of draft-connections being unchanged from that shown in Fig. 1, except in position.

Fig. 4 is a view similar to Fig. 3, with the arrangement of the draft-connections shown in Fig. 2.

Figs. 5 and 6 are cross sections of the draft-bar.

Fig. 7 is a plan of the draft-bar folded to accommodate three harrow sections, the connections therefor agreeing with those in Figs. 2 and 4.

Fig. 8 is a plan of a portion of the draft-bar, showing certain connecting members.

Fig. 9 is a plan of a hinged joint for the sections of the draft-bar.

Fig. 10 is a plan of a draft-bar, showing a slightly modified form of draft-connections; and, Fig. 11 is a detail of parts of certain connecting members.

A represents several harrow sections and B, B', B², B³ sections of a draft-bar corresponding in number to the sections of the harrow. These said draft-bar sections are hinged together at their rear sides by means of hinge members shown in Fig. 9, wherein C indicates a bifurcated member secured to the ends of each draft-bar section and connected by means of bolts D, one of which is shown in the figure last named, whereby the draft-bar will be rigid throughout as a single member.

E indicates a pair of plates, one above and one below the draft-bar at the middle of its length, the removal of one of whose bolts F nearest the end of a section permits the two halves of the draft-bar to pivot relatively to one another in a horizontal direction, if desired.

G G are linking means between the harrow sections and said draft bar. The draft-connections in Fig. 1 consist first of two reaches H which may be single rods or jointed, as desired, each being connected at one end to one of the inner sections B', B² of the draft-bar by means of eye-bolts J for example, their other ends carrying a link K for attachment to any ordinary clevis, for example, not shown, and of reaches consisting of links L L connected at one of their ends to one of the links K, their other ends being connected with the ends of rods M which in turn are hooked into a bar N provided with a series of holes N', said bar being connected to a rod O by a bolt O' which rod in turn is connected to an eye-bolt P in the outer harrow sections B, B³.

The parts L, M and O may be so adjusted by means of the bars N and the bolts O' that the links K may lie close together to receive the mentioned clevis, all of the connections having an equal pull upon said draft-bar.

Fig. 2 shows a slightly different arrangement of the draft-connections wherein the rods M are directly attached at their ends to the eye-bolts P, the rods O and the bars N being eliminated, the connections otherwise being the same as before. The links K by this arrangement are now widely separated so that a team of horses may be attached to each and when thus used one of the described bolts F nearest the end of one of the sections of the bar may be removed so that the two halves of the bar may swing relatively in use.

The form shown in Fig. 1 accommodates one or more teams at the middle of the draft-bar as is now understood, while in Fig. 2 the draft animals may be separated and may work independently on the two halves.

In Fig. 3 the two outer sections of the draft-bar are folded over upon the two inner sections, the two outer harrow-sections having been removed or placed on top of the inner ones, as desired. In this form the implement is in position to be transported from field to field, or it may be used as a two-harrow-section outfit for a single team, the same connections being used as those shown in Fig. 1.

An important part of my invention is the inclusion of a support on the two outer sections B B³ of the draft-bar, for example, for supporting portions of the draft-connections. This support, as shown in Figs. 5 and 6 may consist of a suitable hook Q. One of these is shown in Fig. 1 being attached near the inner end of each outer draft-bar section B, B³ and in the position of the draft-bar section shown in said Fig. 1, the hooks open downward but when these sections are folded over as in Fig. 3 the hook then opens upward as in Fig. 6 and receives the rod O, see Fig. 3. These hooks provide for supporting the slack portion or portions of the connections M, N O when said sections B and B³ or either of them is folded, the draft or pull upon the draft-bar then being through the reach H only, there being no pull upon the upper folded-over sections.

Fig. 4 shows the same arrangement of the sections as that in Fig. 3 but the connections therefor are like those shown in Fig. 2; that is to say, merely the rods M, and the reaches H are shown together with the links K, L. This shortening of the connections by the elimination of the parts M, N, O admits of the sections of the bar being folded over upon one another when the said connections are to accomodate two separate sets of draft-animals and where the pull is to be placed upon but two harrow sections, though it is observed that the said reaches H are the only pulling members, the rods M and links L being slack and idle.

In the forms shown in Figs. 1 and 3 it is observed that the draft is applied in one place or at the middle of the draft-bar, while in Figs. 2 and 3 the draft is applied at two places, the forms in Figs. 3 and 4 in both instances being contractions of the forms shown in Figs. 1 and 2 respectively.

In Fig. 7 the outer sections B of the bar has been folded over, the same connections being employed as those shown in Fig. 2, it being observed that in folding over said outer section the draft connection at that end takes the same position as either of those shown in Fig. 4, the one at the right corresponding in form to one of those in Fig. 2.

Fig. 10 shows a three section draft-bar similar to that in Fig. 7, wherein the draft-connections instead of providing for two points of attachment for the horses provide for the attachment at one place only or at the link R.

S is a link connecting the link R to a link R' and a rod T which in turn is connected to an eye-bolt U at the middle of the draft-bar section at the right. V is a rod extending from the link R to an eye-bolt W at the middle of the central draft-bar section.

2 is a link connected at one end to the link R and at its other end to a perforated bar 3. Attached to the latter is a hook 3' adjustable thereon and engaging a link 4 connected to an eye-bolt 5 in the remaining end section of the draft-bar. 6 is a hook on the last named section and corresponds to the hooks Q. It is adapted to receive the link 4 when the section carrying the eye-bolt 5 is folded over to make a two section draft-bar.

In this folded position the eye-bolt 5 will overlie the eye-bolt W, the link 4 being placed in and supported by the hook 6, the hook 3', in use slipping along said link 4 as indicated in broken lines, thus slackening the connection between the link R and the section thus folded over. The pull for the two horse harrow thus formed is now through and from the link R' which is directly forward of the connecting plates F.

I am aware of a number of patented draft-bars for connection to harrow sections but in none of these is there provision for converting a four section draft-bar, for four-harrow sections, to one of two sections with the same draft-connections to which the power may be attached at a single point in either form and in which those portions connected with the sections of the bar folded-over may slacken to remove all draft upon the said folded-over section. Neither is provision made, when folding the sections of the bar over and upon one another, whereby that portion of the connection attached to the folded-over section after being slackened is supported by a part such as Q. In the older forms just as much pull is transferred to said folded-over section as the one on which it rests and this results in a straining of the hinge connections corresponding to the hinge connections C described herein and a disarrangement of the parts otherwise.

It may be seen that the peculiar manner of arranging the connections provided herein admits of attaching the horses or power at one or two points for two, three or four harrow sections as may be the wish for the particular work to be done, and that either form for four sections in Figs. 1 and 2 may be readily adapted for drawing a two section harrow.

The form in Figs. 1 and 3, where the power is applied at a common point, is readily converted by providing such connections as will admit of parts thereof being automatically slackened so that no pull can be transferred through them. This is provided for by furnishing the linked connections that can be disposed on the supporting hooks Q where they will not drag or be in the way.

Also in the form in Figs. 2 and 4 when there are two points of attachment the linked connections L, M permit folding of the draft-bar-sections and at the same time automatically remove all draft upon the folded-over-section so that the pull must be upon the lower section only. The jointed reaches made up of rods M, O, link L, and bar N, may be otherwise constructed, of course, to provide for changes in the lengths thereof, and the reaches H may be of single parts as shown or may be otherwise constructed depending upon the desires of the user.

Having thus described my invention, I claim:—

1. A draft attachment of the class described including in combination with a draft-bar of hinged sections, a draft connection consisting of two reaches of unequal length each having connection at one end with one of the sections and terminating at their other ends at a common point for attachment to a draft device, the longest of the reaches adapted to be folded with the section to which it is attached, and a part to support said reach in its folded position.

2. A draft attachment of the class described including in combination with a draft-bar of hinged sections, a draft connection consisting of two reaches of unequal length each having connection at one end with one of the sections and terminating at their other ends at a common point for attachment to a draft device, the longest of the reaches adapted to be folded with the section to which it is attached, and a part on the draft-bar to support said reach in its folded position.

3. In combination with a foldable draft-bar of hinged sections and a draft connection consisting of two reaches of unequal length, each having connection at one end with one of the sections and terminating at their other ends at a common draft point, the section to which the longest reach is attached adapted to fold upon the other section, and a part to support said longest reach when said section to which it is attached is folded.

4. The combination with a draft-bar of foldable sections, of a draft attachment consisting of a reach extending from each of them and terminating at a common point for attachment to the power, the reaches being of unequal length, both adapted by their position at said common point to draw equally upon their respective section, and a part carried by the draft-bar to support the longest reach when the section to which that reach is attached is folded upon an adjacent section.

5. A draft-bar of the character described comprising a plurality of foldable sections and a draft-attachment foldable with them including in its construction a link for attachment to the power, a substantially rigid member connecting the link and one of the said sections, and a part also connecting the link with another of the sections consisting of jointed members, and a support on one of the sections to carry one of the members of said part in the folded positions of the said sections.

6. A draft-bar of the character described comprising a plurality of foldable sections, a draft attachment foldable with them including a link for attachment to the power adapted for a position forward of the middle of the length of the draft-bar, a substantially rigid member connecting the link with one of the said sections, and a part also connecting the link with another of the sections consisting of jointed members, and a support on one of the sections to receive one of the members of said part in their folded position.

7. The combination with a draft-bar of a series of foldable sections, of a draft attachment consisting of a series of reaches each attached at one end to one of the sections, all of said reaches terminating at a common draft point opposite the middle of the length of said draft-bar, the reach of each outermost section of said series being jointed, and a part at the opposite extremities of the draft-bar to support the jointed reaches when the said outermost sections are placed upon the sections adjacent thereto.

8. In combination with a draft-bar, for the attachment thereto of harrow sections, consisting of a plurality of sections adapted to fold upon one another, of a draft attachment comprising a reach connected to each of the said outer sections, and a reach connected to an inner section, all of the reaches at the draft ends thereof terminating at substantially a common point, and all adapted to pull evenly upon their respective sections in the open arrangement of the sections, the outer reaches adapted to automatically slacken in folding of the sections upon one another whereby to remove the draft upon the outer sections to which they are attached.

9. In combination with a draft-bar, for the attachment thereto of harrow sections, consisting of a plurality of sections adapted to fold upon one another, of a draft attachment comprising a reach connected to each of the said outer sections, a reach connected to an inner section, all of the reaches at the draft ends thereof terminating at substantially a common point, and all adapted to pull evenly upon their respective sections in the open arrangement of the sections, the outer reaches adapted to automatically slacken in folding of the sections upon one another whereby to remove the draft upon the outer sections to which they are attached, and a support on the draft-bar for each reach so slackened.

In testimony whereof I affix my signature, in presence of two witnesses.

PATRICK L. DONOVAN.

Witnesses:
W. I. SLEMMONS,
LOUISE H. MASCH.

Copies of this patent may be obtained for five cents each, by addressing the "Commissioner of Patents, Washington, D. C."